US010960306B2

(12) United States Patent
Paradise

(10) Patent No.: US 10,960,306 B2
(45) Date of Patent: *Mar. 30, 2021

(54) MANAGEMENT OF STREAMING VIDEO DATA

(71) Applicant: Skillz Inc, San Francisco, CA (US)

(72) Inventor: Andrew Paradise, San Francisco, CA (US)

(73) Assignee: SKILLZ INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/536,956

(22) Filed: Aug. 9, 2019

(65) Prior Publication Data

US 2019/0358538 A1    Nov. 28, 2019

Related U.S. Application Data

(63) Continuation of application No. 16/001,259, filed on Jun. 6, 2018, now Pat. No. 10,421,011, which is a
(Continued)

(51) Int. Cl.
*A63F 9/24* (2006.01)
*A63F 11/00* (2006.01)
(Continued)

(52) U.S. Cl.
CPC ............ *A63F 13/35* (2014.09); *A63F 13/332* (2014.09); *A63F 13/335* (2014.09);
(Continued)

(58) Field of Classification Search
USPC .......................... 463/1, 20, 22, 25, 31, 39, 42
See application file for complete search history.

(56) References Cited

U.S. PATENT DOCUMENTS 5,411,258 A    5/1995    Wilson et al.
6,443,841 B1    9/2002    Rossides
(Continued)

FOREIGN PATENT DOCUMENTS

CN    103945912 A    7/2014
EP    1684228 A1    7/2006
(Continued)

OTHER PUBLICATIONS

Dreef et al. (2004) "Measuring Skill in Games: Several Approaches Discussed", Mathematical Methods of Operations Research, 59(3):375-391.
(Continued)

*Primary Examiner* — Adetokunbo O Torimiro
(74) *Attorney, Agent, or Firm* — Mintz, Levin, Cohn, Ferris, Glovsky and Popeo, P.C.

(57) ABSTRACT

User action data characterizing action by a player in a game environment executing at a user client is received at a server. The game environment is created by the user client separate from the server. Data characterizing a selected viewing position is received. The selected viewing position is different than a player viewing position. The selected viewing position characterizes a viewing location within the game environment. A recreated game environment is generated from the user action data at the server. A video stream of the recreated game environment is generated. The video stream includes video from a perspective of the selected viewing position. The video stream is transmitted to a viewing client. Related apparatus, systems, articles, and techniques are also described.

20 Claims, 7 Drawing Sheets

Related U.S. Application Data continuation of application No. 15/459,313, filed on Mar. 15, 2017, now Pat. No. 10,016,674, which is a continuation of application No. 62/309,327, filed on Mar. 16, 2016.

(51) Int. Cl.
| | | |
|---|---|---|
| *G06F 13/00* | (2006.01) | |
| *G06F 17/00* | (2019.01) | |
| *A63F 13/35* | (2014.01) | |
| *A63F 13/355* | (2014.01) | |
| *A63F 13/497* | (2014.01) | |
| *A63F 13/5255* | (2014.01) | |
| *A63F 13/332* | (2014.01) | |
| *A63F 13/335* | (2014.01) | |
| *A63F 13/53* | (2014.01) | |
| *A63F 13/86* | (2014.01) | |

(52) U.S. Cl.
CPC .......... *A63F 13/355* (2014.09); *A63F 13/497* (2014.09); *A63F 13/5255* (2014.09); *A63F 13/53* (2014.09); *A63F 13/86* (2014.09); *A63F 2300/406* (2013.01); *A63F 2300/407* (2013.01); *A63F 2300/51* (2013.01)

(56) References Cited

U.S. PATENT DOCUMENTS

| | | |
|---|---|---|
| 6,676,517 B2 | 1/2004 | Beavers |
| 6,699,127 B1 | 3/2004 | Lobb et al. |
| 6,856,986 B1 | 2/2005 | Rossides |
| 8,088,000 B2 | 1/2012 | Ginsberg et al. |
| 8,210,926 B2 | 7/2012 | Asher et al. |
| 8,313,368 B2 | 11/2012 | Filipour et al. |
| 8,360,873 B1 | 1/2013 | Wickett et al. |
| 8,414,387 B1 | 4/2013 | Paradise et al. |
| 8,485,899 B1 | 7/2013 | Rom et al. |
| 8,512,129 B2 | 8/2013 | Ginsberg et al. |
| 8,545,330 B2 | 10/2013 | Wickett et al. |
| 8,562,422 B2 | 10/2013 | Lutnick et al. |
| 8,568,222 B2 | 10/2013 | Gagner et al. |
| 8,613,662 B2 | 12/2013 | Morrow et al. |
| 8,641,511 B2 | 2/2014 | Ginsberg et al. |
| 8,651,948 B2 | 2/2014 | Asher et al. |
| 8,683,272 B2 | 3/2014 | Cadima et al. |
| 8,715,077 B2 | 5/2014 | Paradise et al. |
| 8,790,170 B2 | 7/2014 | Amone et al. |
| 8,882,576 B1 | 11/2014 | Paradise et al. |
| 8,900,054 B2 | 12/2014 | Patel |
| 8,926,435 B2 | 1/2015 | Perry et al. |
| 9,240,101 B2 | 1/2016 | Paradise et al. |
| 9,349,246 B1 | 5/2016 | Paradise et al. |
| 9,446,315 B2 | 9/2016 | Paradise et al. |
| 9,479,602 B1 | 10/2016 | Paradise et al. |
| 9,630,097 B2 * | 4/2017 | Paradise ................. A63F 13/12 |
| 9,649,564 B2 | 5/2017 | Paradise et al. |
| 9,697,680 B2 | 7/2017 | Paradise et al. |
| 9,767,644 B2 | 9/2017 | Paradise et al. |
| 10,016,674 B2 | 7/2018 | Paradise |
| 10,421,011 B2 | 9/2019 | Paradise |
| 2001/0031663 A1 | 10/2001 | Johnson |
| 2001/0044339 A1 | 11/2001 | Cordero et al. |
| 2002/0037767 A1 | 3/2002 | Ebin |
| 2002/0073021 A1 | 6/2002 | Ginsberg et al. |
| 2002/0160824 A1 | 10/2002 | Goto et al. |
| 2004/0204217 A1 | 10/2004 | Herman |
| 2005/0043089 A1 | 2/2005 | Nguyen et al. |
| 2005/0090307 A1 | 4/2005 | Walker et al. |
| 2006/0058103 A1 | 3/2006 | Danieli et al. |
| 2006/0080175 A1 | 4/2006 | Rowe et al. |
| 2006/0098013 A1 | 5/2006 | Wong et al. |
| 2006/0189382 A1 | 8/2006 | Muir et al. |
| 2007/0004509 A1 | 1/2007 | Banton |
| 2007/0026934 A1 | 2/2007 | Herbrich et al. |
| 2007/0037623 A1 | 2/2007 | Romik |
| 2007/0072676 A1 | 3/2007 | Baluja |
| 2007/0136817 A1 | 6/2007 | Nguyen |
| 2007/0191101 A1 | 8/2007 | Coliz et al. |
| 2007/0265092 A1 | 11/2007 | Betteridge |
| 2008/0033734 A1 | 2/2008 | Carry |
| 2008/0108438 A1 | 5/2008 | Sugiyama et al. |
| 2008/0153588 A1 | 6/2008 | Muir et al. |
| 2008/0161113 A1 | 7/2008 | Hansen et al. |
| 2008/0200242 A1 | 8/2008 | Ginsberg et al. |
| 2008/0201159 A1 | 8/2008 | Gabrick et al. |
| 2008/0207327 A1 | 8/2008 | Van Luchene et al. |
| 2008/0214301 A1 | 9/2008 | Sandige et al. |
| 2008/0234047 A1 | 9/2008 | Nguyen |
| 2008/0268961 A1 | 10/2008 | Brook et al. |
| 2008/0287183 A1 * | 11/2008 | Reeves, III ............. G07F 17/38 463/25 |
| 2009/0048010 A1 | 2/2009 | Kroeckel et al. |
| 2009/0099924 A1 | 4/2009 | Lensch et al. |
| 2009/0131177 A1 | 5/2009 | Pearce |
| 2009/0170608 A1 | 7/2009 | Herrmann et al. |
| 2009/0197665 A1 | 8/2009 | Christensen |
| 2009/0208181 A1 | 8/2009 | Cottrell |
| 2009/0209350 A1 | 8/2009 | Kelly et al. |
| 2009/0215540 A1 | 8/2009 | Perlman et al. |
| 2009/0227313 A1 | 9/2009 | Minka et al. |
| 2009/0325709 A1 | 12/2009 | Shi |
| 2010/0022307 A1 | 1/2010 | Steuer et al. |
| 2010/0144426 A1 | 6/2010 | Winner et al. |
| 2010/0166062 A1 * | 7/2010 | Perlman .................. A63F 13/12 375/240.05 |
| 2010/0216536 A1 | 8/2010 | Gagner et al. |
| 2010/0222124 A1 | 9/2010 | Goshen |
| 2010/0234101 A1 | 9/2010 | Morrow et al. |
| 2010/0241699 A1 | 9/2010 | Muthukumarasamy et al. |
| 2010/0304860 A1 | 12/2010 | Gault et al. |
| 2010/0311496 A1 | 12/2010 | Taylor et al. |
| 2011/0010386 A1 | 1/2011 | Zeinfeld |
| 2011/0072056 A1 | 3/2011 | Bakalash et al. |
| 2011/0130197 A1 | 6/2011 | Bytnar et al. |
| 2011/0212766 A1 | 9/2011 | Bowers et al. |
| 2011/0254223 A1 | 10/2011 | Valentine |
| 2011/0281645 A1 | 11/2011 | Wolfson et al. |
| 2011/0300949 A1 | 12/2011 | Filipour et al. |
| 2012/0004039 A1 | 1/2012 | Perry et al. |
| 2012/0013622 A1 | 1/2012 | Mahajan et al. |
| 2012/0028718 A1 | 2/2012 | Barclay et al. |
| 2012/0100918 A1 | 4/2012 | Ginsberg et al. |
| 2012/0122553 A1 | 5/2012 | Bunch et al. |
| 2012/0156668 A1 | 6/2012 | Zelin |
| 2012/0178514 A1 | 7/2012 | Schulzke et al. |
| 2012/0196687 A1 | 8/2012 | Graham et al. |
| 2012/0252579 A1 | 10/2012 | Sethi et al. |
| 2012/0281080 A1 | 11/2012 | Wang |
| 2013/0029760 A1 | 1/2013 | Wickett et al. |
| 2013/0079072 A1 | 3/2013 | Filipour et al. |
| 2013/0121614 A1 | 5/2013 | Intwala |
| 2013/0151614 A1 | 6/2013 | Beerse et al. |
| 2013/0165196 A1 | 6/2013 | Kroeckel et al. |
| 2013/0172086 A1 * | 7/2013 | Ikenaga .................. A63F 13/10 463/43 |
| 2013/0179798 A1 | 7/2013 | Korupolu et al. |
| 2013/0217482 A1 | 8/2013 | Kelly et al. |
| 2013/0226983 A1 | 8/2013 | Beining et al. |
| 2013/0273987 A1 | 10/2013 | Laycock et al. |
| 2013/0331177 A1 | 12/2013 | Amone et al. |
| 2013/0339473 A1 | 12/2013 | McCaffrey et al. |
| 2013/0344960 A1 | 12/2013 | Perry et al. |
| 2013/0344963 A1 | 12/2013 | Gupta et al. |
| 2014/0024427 A1 | 1/2014 | Cole et al. |
| 2014/0024437 A1 | 1/2014 | Vann et al. |
| 2014/0031132 A1 | 1/2014 | Wickett et al. |
| 2014/0045589 A1 | 2/2014 | Paradise et al. |
| 2014/0094267 A1 | 4/2014 | Davis et al. |
| 2014/0100023 A1 | 4/2014 | Amone et al. |
| 2014/0128147 A1 | 5/2014 | Yu Cheng et al. |
| 2014/0194188 A1 | 7/2014 | Kosta et al. |
| 2014/0200062 A1 | 7/2014 | Paradise et al. |

(56) References Cited

U.S. PATENT DOCUMENTS

| | | |
|---|---|---|
| 2014/0323199 A1 | 10/2014 | DiMichele et al. |
| 2014/0323204 A1 | 10/2014 | Paradise et al. |
| 2015/0024839 A1 | 1/2015 | Zahn et al. |
| 2015/0065226 A1 | 3/2015 | Paradise et al. |
| 2015/0121437 A1 | 4/2015 | Tan |
| 2015/0202529 A1 | 7/2015 | Paradise et al. |
| 2016/0055710 A1 | 2/2016 | Paradise et al. |
| 2016/0110960 A1 | 4/2016 | Paradise et al. |
| 2016/0253866 A1 | 9/2016 | Paradise et al. |
| 2017/0225075 A1 | 8/2017 | Paradise et al. |
| 2017/0249802 A1 | 8/2017 | Paradise et al. |
| 2017/0266549 A1 | 9/2017 | Paradise |
| 2017/0266552 A1 | 9/2017 | Paradise et al. |
| 2017/0270751 A1 | 9/2017 | Paradise |
| 2018/0280796 A1 | 10/2018 | Paradise |

FOREIGN PATENT DOCUMENTS

| | | |
|---|---|---|
| EP | 1738810 A1 | 1/2007 |
| EP | 2695650 A1 | 2/2014 |
| JP | 2003144745 A | 5/2003 |
| KR | 1020000018932 A | 4/2000 |
| WO | 2011149564 A1 | 12/2011 |
| WO | 2017160932 A1 | 9/2017 |

OTHER PUBLICATIONS

Fiedler et al. (2009) "Quantifying Skill in Games—Theory and Empirical Evidence for Poker", Gaming Law Review and Economics, 13(1):50-57.

\* cited by examiner

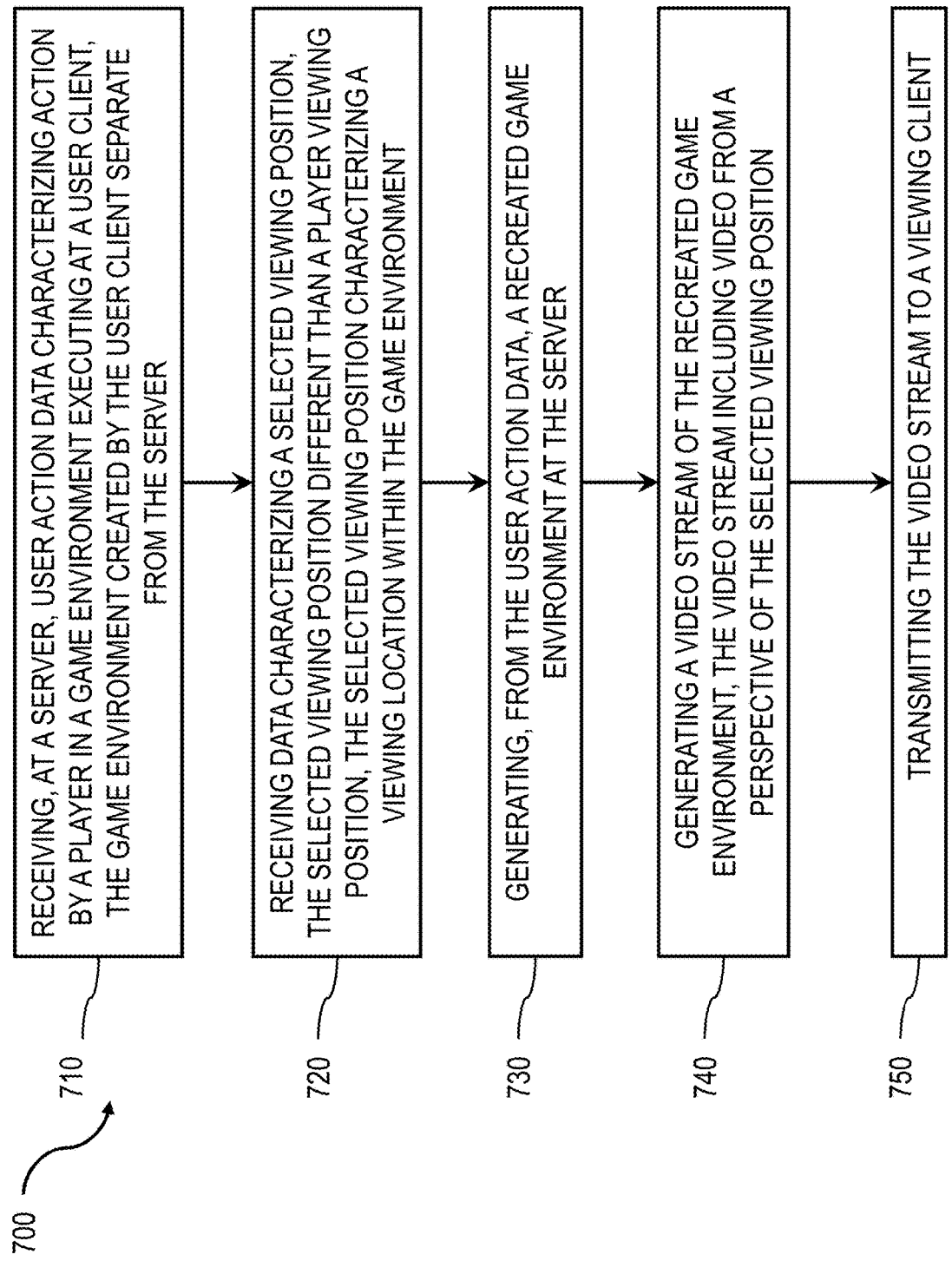

MANAGEMENT OF STREAMING VIDEO DATA

CROSS-REFERENCE TO RELATED APPLICATION

This application is a continuation of and claims priority under 35 U.S.C. § 120 to U.S. application Ser. No. 16/001,259, filed Jun. 6, 2018, allowed, which claims priority under 35 U.S.C. § 120 to U.S. application Ser. No. 15/459,313, filed Mar. 15, 2017, and granted as U.S. Pat. No. 10,016,674, which claims priority under 35 U.S.C. § 119(e) to U.S. Provisional patent application No. 62/309,327 filed Mar. 16, 2016, each of which is hereby expressly incorporated by reference herein.

TECHNICAL FIELD

The subject matter described herein relates to streaming of video and audio data, for example, relating to real-time game play and commentary from multiple sources to multiple viewers simultaneously.

BACKGROUND

Video game streamers typically engage with their audience by showing live footage of their own gameplay. Sometimes their own commentary is provided during the gameplay. While this is an effective means of displaying what the streamer is seeing on his or her game screen, there is no effective means for a streamer to display and represent what is happening to other players in separate parts of a game or eSports competition.

SUMMARY

In an aspect, user action data characterizing action by a player in a game environment executing at a user client is received at a server. The game environment is created by the user client separate from the server. Data characterizing a selected viewing position is received. The selected viewing position is different than a player viewing position. The selected viewing position characterizes a viewing location within the game environment. A recreated game environment is generated from the user action data at the server. A video stream of the recreated game environment is generated. The video stream includes video from a perspective of the selected viewing position. The video stream is transmitted to a viewing client.

One or more of the following features can be included in any feasible combination. For example, the user action data can include data characterizing user interface actions by the player with the game environment. Generating the recreated game environment can include executing a game engine using game state data and the user activity data. The server can include the game engine that receives the selected viewing position and the user action data and renders the recreated game environment from the perspective of the selected viewing position.

The user activity data can be retrieved from a database and the user activity data can be associated with a historical game play. The user activity data can be received from the user client or a game hosting server. The user activity data can be from an ongoing executing game environment. Generating the video stream can include capturing a rendered recreated game environment. An audio stream can be received from a commentator client. The audio stream can be combined with the video stream prior to transmission of the video stream. Statistics on the player can be generated using user action data. The statistics can be transmitted to the viewing client.

As eSports grow in popularity, there is a need for a toolkit that facilitates streamers, as individuals, to perform the same level of commentary and gameplay analytics that is performed by analyst teams in the parallel industry of physical sports.

The presently described subject matter can provide an automated broadcast studio for a streamer to cover an eSports tournament being played in a plurality of different games. The presently described subject matter can capture video data, or action data, from all tournament participants. A video queue interface can be delivered for streamers to view, select, and play videos or clips of events occurring within the tournament. In some variations, views as seen by players in a tournament can be included in the video queue. In other variations, the view point can be selected by the commentator, or streamer, of the streaming content. The selected view point need not be a player view point.

The presently described subject matter can break down video into highlight reels and key segments based on an analysis of event data. The presently described subject matter can facilitate the provision of game analytics, and assemble a suggested broadcast for the streamer.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. It should be readily understood that features described herein are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 7 is a process flow diagram illustrating a method of generating a video stream from a commentator perspective.

DETAILED DESCRIPTION

A tool kit is provided to effectively and efficiently stream game play video and audio data and commentary data to viewers of streaming content during an eSports competition. The tool kit can provide an automated broadcast studio for a streamer to cover an eSports tournament occurring in a game. The toolkit can facilitate video and audio capture from all tournament participants. The toolkit can facilitate delivery of a video queue interface for streamers to view, select, and play videos or clips. The toolkit can be configured to break down game play into highlight reels and key segments, provide game analytics, and assemble a suggested broadcast for the streamer based on game play events. In some implementations, a game environment can be recreated for the commentator to explore and/or generate new video content from any desired viewing position, angle, and/or point in time. This approach can reduce the amount of data that needs to be transmitted between game participant devices, streaming servers, and game observer devices.

Figure 1:
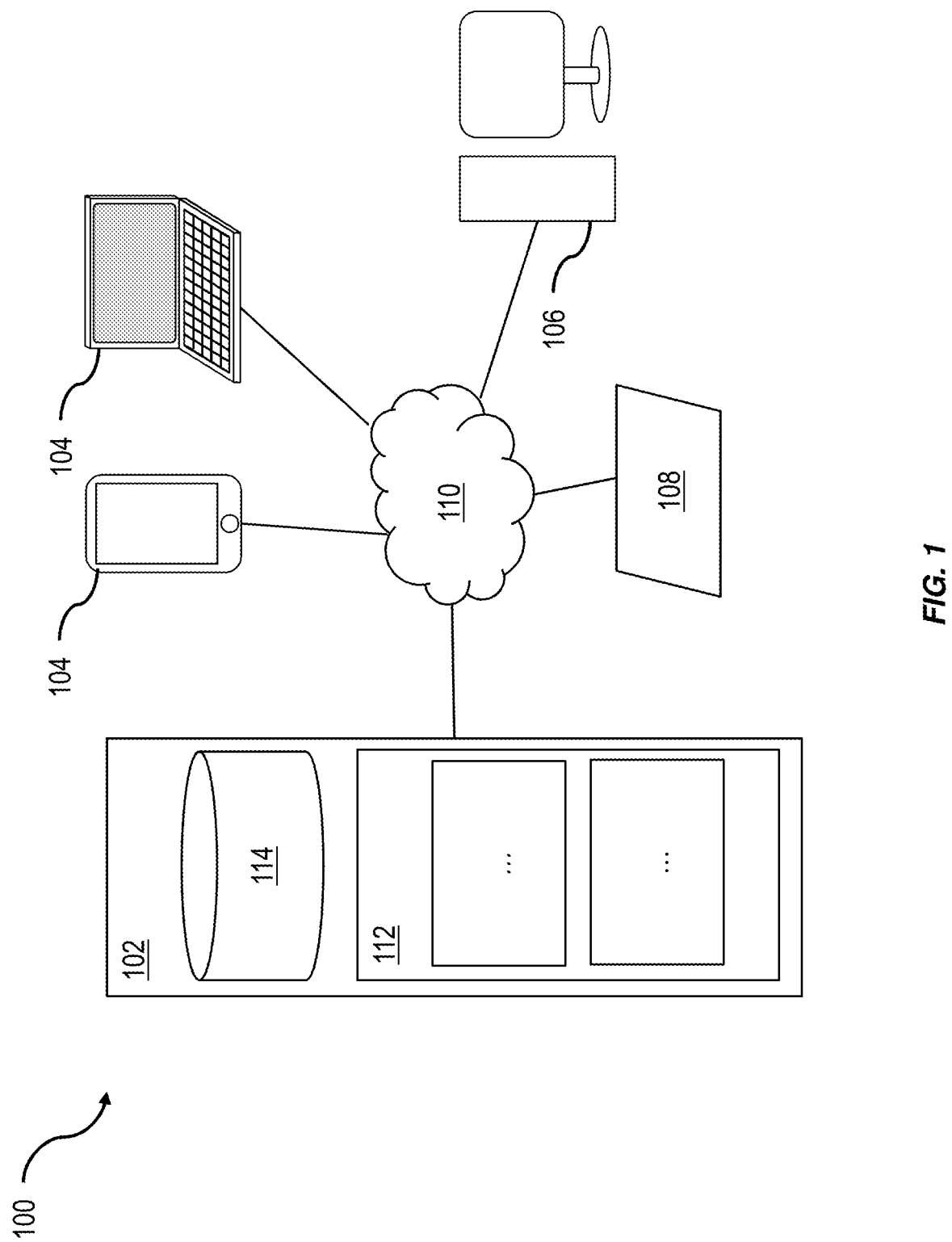
FIG. 1 is a diagram illustrating aspects of a system showing features consistent with implementations of the current subject matter.

FIG. 1 is an illustration of a system 100 having one or more features consistent with the present subject matter. The system 100 can include a server 102 configured to manage and maintain a streamer toolkit. The system 100 can include one or more client devices 104. The one or more client devices 104 can be associated with players of games that are participating in tournaments. Client devices 104 can include one or more of a laptop, Netbook, smartphone, mobile device, tablet, desktop computer, or the like. The system 100 can include a commentator device 106. The commentator device 106 can be a similar device to the client device(s) 104. The system 100 can include external resources 108. External resources 108 can include one or more third-party servers providing resources for use by one or more of the server 102, client device(s) 104, commentator device 106, or the like.

Server 102, client device 104, commentator device 106, external resources 108, and/or other components of system 100, can be in electronic communication through a network 110. The network can be a local area network, wide area network, the Internet, a cloud network, or the like.

The server 102 can be configured to maintain a streamers toolkit. The streamers toolkit can be configured to facilitate streaming of game play and commentary to one or more client devices 104. In some variations, facilitating streaming of game play can include receiving audio and video data from a device associated with a game participant. The audio and video data can be representative of the view and sounds presented by the game to the game participant. In other variations, facilitating the streaming of game play can include receiving player action information representative of a player's actions being taken within the game by a game participant.

In some variations, where data representative of a player's actions is obtained, the streaming toolkit can be configured to reconstruct the game play on client devices 104 to which the game play has been streamed. In this way, a greatly reduced amount of data can be transmitted between game participant devices and game observer devices.

Game participants and game observers may be connected to the system 100 through similar devices, such as client devices 104.

In some variations, game play data can be streamed directly from a game participant device to a game observer device without the game play data being routed through a server 102, or through a commentator device 106. The commentator data, being data generated by the commentator device 106, can be transmitted to game observer devices such that the commentary and game play data can be synchronized.

The game play data, whether video and audio streams, or game participant action data, can be first provided to the commentator device 106. The commentator, through the commentator device 106 can curate the stream of game play that is provided to the game observers, together with any commentary or animations that the commentator desires to add.

The system 100 can facilitate receipt, by game observers, of streaming data provided by the commentator.

Figure 4:
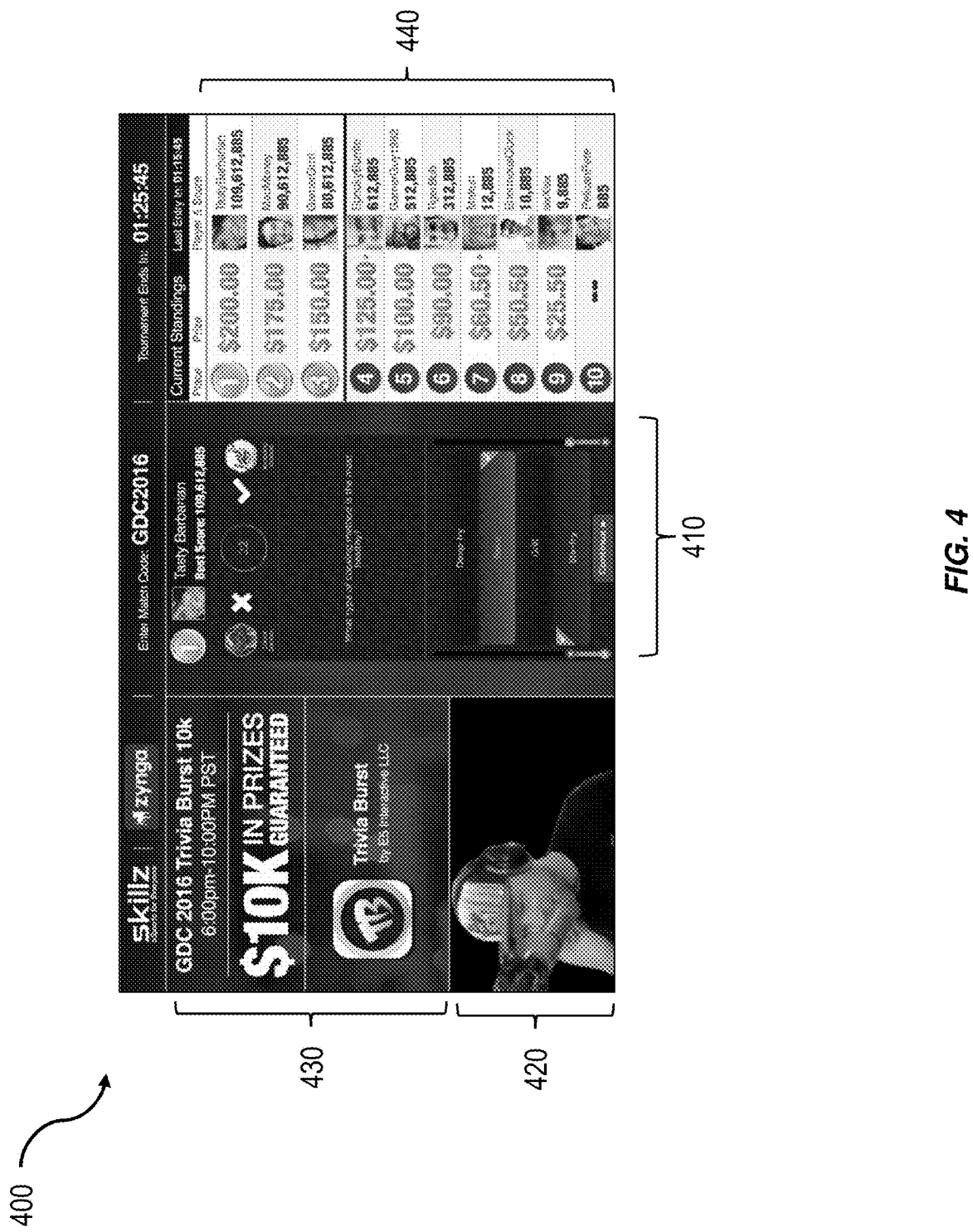
FIG. 4 is an illustration of a graphical user interface having features consistent with the presently described subject matter.

FIG. 4 is an illustration of a graphical user interface 400 having features consistent with the presently described subject matter. Graphical user interface 400 is an exemplary embodiment of a graphical user interface presented to a game observer. The graphical user interface 400 can include content that is shared by the commentator. The content can include video replays, a feed of the streamer, tournament information, and current leaderboard status.

Figure 5:
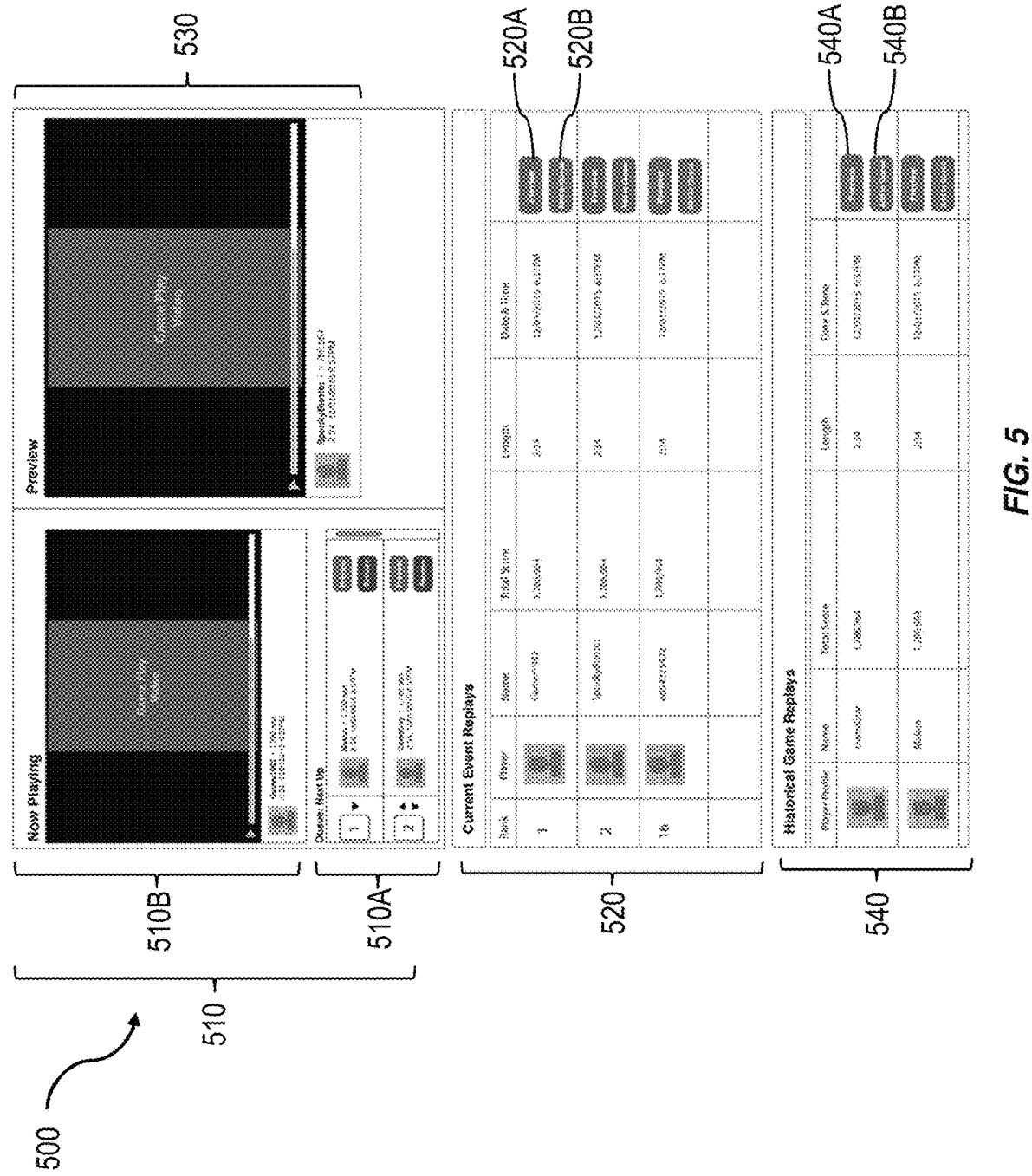
FIG. 5 is an illustration of a graphical user interface having features consistent with the presently described subject matter.

FIG. 5 is an illustration of a graphical user interface 500 having features consistent with the presently described subject matter. Graphical user interface 500 is an exemplary embodiment of a graphical user interface presented to a commentator, or streamer. The graphical user interface 500 can be configured to facilitate the commentator to provide a high quality and engaging video feed to their audience.

The toolkit can be configured to facilitate capture of video replay of all game participants who participate in a tournament. The toolkit, or streaming management system can be configured to facilitate providing access, by a streamer, to a list of all competitors in the event about which he or she is commentating. The streamer, or commentator, can have access to each participant's associated replay(s).

For each participant, the streamer has multiple actions that they can take using the captured video replay of the participant. For example, the streamer can view a preview of the game play for a particular participant. The streamer can privately view the replay of a participant without sharing that video to the live stream. This tool gives the streamer flexibility to review plays before having to speak about them, seek out a specific moment of the replay that he or she wants to show, or otherwise preview the replay before showing it to his or her audience.

The streamer can add video replay sections for participants in the game to a queue. The streamer can annotate the video replay, add statistics for display from the annotations feed, and the like.

The video queue graphical user interface 500 can allow the streamer to interact with and control what is being broadcasted to his or her stream. In some exemplary implementations, the graphical user interface 500 can include multiple areas, such as for example, a now playing stream area, a queue area, and the like.

The now playing stream area can be configured to show the streamer what replay is being currently broadcast to their stream. This is a persistent space that allows the streamer to monitor what they are currently sharing even while using the window to preview streams or adjust replays in a way that will not be shared with the audience.

The queue area can be configured to facilitate control of the order that replays are to be broadcast on the streamer's stream. The graphical user interface 500 can facilitate adding of individual replays that the streamer would like to show next, change the order of videos are to be broadcast, or the like. In some implementations, the toolkit can be configured to automatically stream video of game play in the event that the streamer chooses not to add any content to the queue, or if the queue becomes empty. Preset criteria can be provided to dictate what is shown when a content queue becomes empty. For example, video content showing the game play of the top three competitors can be presented, content of major actions or events within the tournament can be presented, or the like.

In some variations, user action information can be transmitted to the commentator device 106. The system 100 can be configured to recreate the game environment in which the tournament is being played for the commentator or streamer. The streamer can select a location and a viewing angle at which to stream from, this can be referred to, for example, as the streamer's viewpoint. The system 100 can be configured to facilitate moving of the streamer's viewpoint by the streamer. Game play footage can be streamed to game observers from the viewpoint of the streamer.

The system 100 can be configured to analyze game play and present interesting game play footage to streamers for streamers to select and add to their stream queues, in the graphical user interface 500. The system 100 can be configured to analyze game play and select interesting game play footage based on actions taken by game play participants, based on events experienced by game play participants, game play events selected by other game streamers, or the like.

The system 100 can analyze the game play to provide statistics to the streamer. The system 100 can facilitate the streamer to work as a one-person team and have interesting footage readily available to stream without having to take breaks from the live stream to look up past footage or statistics on players and/or non-player characters.

In some variations, automated analysis of the game play can include an automatic capture of a full history of all of a player's game records and details of the player's in-game play. The system 100 can be configured to compute a player's skill level based on a player's play history across all games, the current game, the current tournament within the game, or the like. The player information can be used to automatically provide a stream of interesting statistics on a particular player that a streamer can use to enhance their broadcast. For example, statistics can include information such as Player A beats Player B 57% of the time in general, but only 47% of the time on the particular level being broadcast, and only 43% of the time given his current position in this replay.

The system 100 can be configured to cause replays and player lists to appear in an order selected by the streamer. For example the order can be their current rank in the tournament, their current skill level in a particular game, their current rank among all players in a common game platform that hosts multiple games, or the like. When the order is based on players' current rank, a presumption can be made that the most interesting events involve participation of the most highly ranked players. Alternatively, a metric of how exciting an event is likely to be can be based on a relative difference in ranking of the participants in a multiplayer game. In other words, players who are closely watched in skill level can be assumed to have a higher likelihood of participating in a more interesting game. Consequently, this configuration can make it easy to find the more interesting game replay. Prior to watching the video playback of the game play for a user, the streamer will know what level of player has been selected and what the outcome of their game will likely be.

The system 100 can be configured to provide historical game replays. In some variations, links can be provided to historical replays of the same game that occurred during previous tournaments, actions taken by the player in similar but different games, or the like. This can facilitate the streamer to provide their favorite footage for easy reference. Example uses include showing the best game ever recorded, keeping a reference of themselves playing the game, using footage with a specifically interesting or relevant play or strategy, showing a matchup between the players in a previous game, or the like.

The graphical user interface 500 can be configured to provide a notification to the streamer, or commentator, that a change in the leaderboard has occurred. In some variations, this can be limited to a certain number of players at the top of the leaderboard, or the bottom of the leaderboard. The graphical user interface 500 can be configured to notify the streamer when a game participant moves up or down an uncharacteristically large number of places on the leaderboard. The analytics provided by system 100 can be configured to detect segments where a change in a score (or other success metric) per unit time is abnormally high or low. This can facilitate easy detection of key plays within the game, where a player secures victory or focus on areas where an otherwise good player struggled and may have lost the game.

The graphical user interfaces 400 and 500 can be configured to facilitate provision of real-time score updates to the streamer and indicate whether or not the player is currently on track to beat their previous score or secure a top spot in the leaderboard. This takes the current concept of "splits", as seen in the Olympics, and makes it work automatically for any eSport, regardless of type of scoring.

Figure 2:
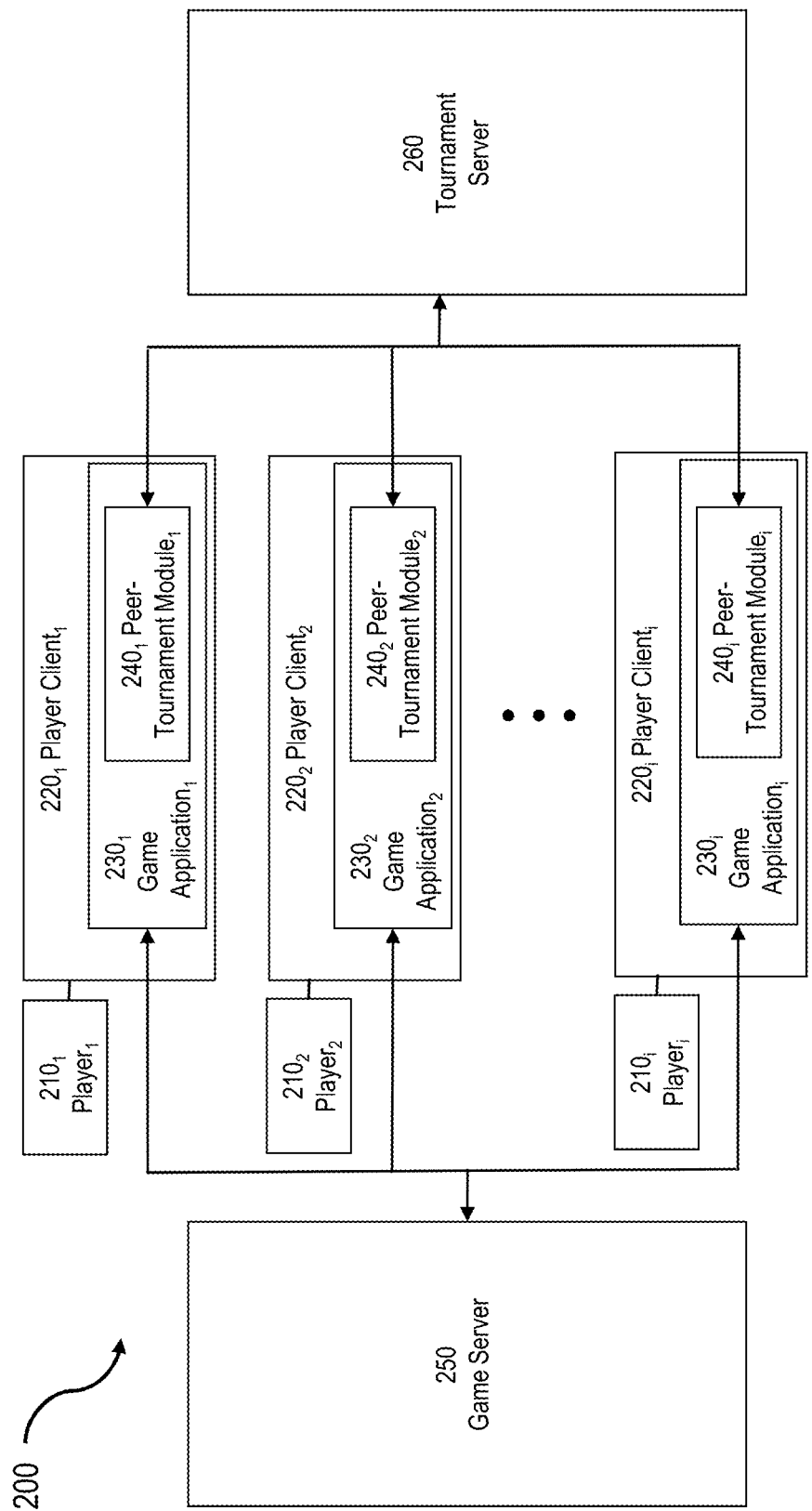
FIG. 2 is a system block diagram illustrating an example system for implementing a peer-to-peer digital gaming tournament.

FIG. 2 is a system block diagram illustrating an example system 200 for implementing a peer-to-peer digital gaming tournament. The system 200 includes a tournament server 260 that enables tournament play between players of a game.

A plurality of players $210_i$ (i=1, 2, . . . , N) operate respective player clients $220_i$. Each player client $220_i$ includes a third party game application $230_i$. The game application $230_i$, can be any online digital game (e.g., video game). In some implementations, multiple players $210_i$ can compete against one another online. Games can be consistent across game applications 230, (e.g., if the players 210, are playing chess, each game application 230, is an instance of an electronic chess game). Each game application 230 can be in communication with and receiving game data from a game server 250. The game server 250 provides game data necessary to operate the game. The game server 250 can be a third party game server, e.g., separate from the tournament server 260 and with limited accessibility by the tournament server 260 (e.g., the tournament server 260 has either no communication or limited API call access to the game server). Player clients 220 may include mobile devices (e.g., smartphones, tablets, and the like), and the player clients 220, game server 250, and tournament server 260 can implement the tournament over a network, such as the internet.

Each game application 230 includes a peer-tournament module $240_i$. Peer-tournament module 240 integrates into game application 230 and enables players 210 to enroll and participate in an online game competition. Peer-tournament module 240 communicates with and works in tandem with the tournament server 260. While a game application 230 is running a match (e.g., a game instance), the game application 230 has an internal game state that changes over time as the associated player 210 interacts with (e.g., plays) the game. Peer-tournament module 240 can capture the game state data periodically, and/or continuously and transmit the captured game state to the tournament server 260. The game state data can include user action data including a characterization of user input into an interface such as key-presses, mouse/joystick/direction-pad inputs, and the like. The tournament server 260 can receive the game state from multiple peer-tournament modules 240. The matches may be separate in that they do not share a game state. For example, each game application 230 can be an asynchronous single player game. In some implementations, the matches share a game state (e.g., multiple players interact within one game environment).

In some implementations, the peer-tournament module 240 and the tournament syntax server 260 does not provide game data to the game application $230_i$. In other words, in some implementations, they do not contribute to implementing a game instance but rather observe the game, capture a game state, and enable a separate layer of multi-match tournament functionality.

Figure 3:
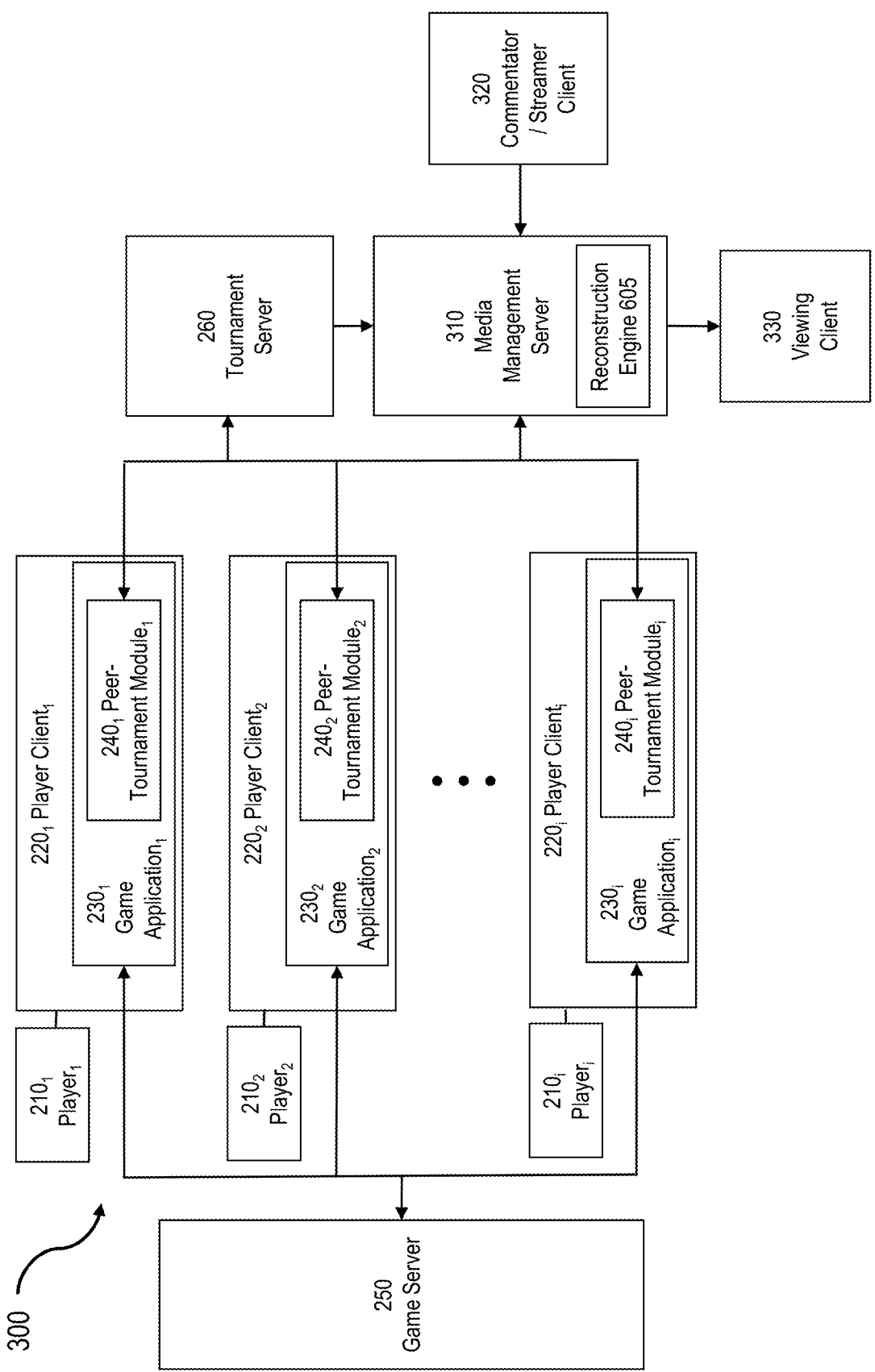
FIG. 3 is a system block diagram of a system with an example media management server enabling video streaming of an online eSports tournament.

FIG. 3 is a system block diagram of a system 300 with an example media management server 310 enabling video streaming of an online eSports tournament. The example system 300 includes the components as described above with reference to FIG. 2 and further includes a media management server 310. Media management server 310 interfaces with a tournament commentator 320, which can be the tournament host, participant, or third party (also referred to as a streamer 320). Commentator 320 can be a client device. Media management server 310 can provide an automated virtual broadcast studio for tournament commentator 320 to cover an eSports tournament. Media management server 310 receives game state data from tournament server 260 and can automatically recreate a gaming environment, allow a commentator to select or specify viewing parameters (such as camera position and viewing angle), and generate a video stream from the commentators selected or specified view point. The generated commentator viewpoint video stream can be provided to viewing clients 330 and/or players 210 and/or used to assemble a suggested broadcast for the tournament commentator 320. Media management server 310 can broadcast a live video feed (as controlled by tournament commentator 320) to players 210 and/or viewing clients 330. The example media management server 310 includes a reconstruction engine 605.

Figure 6:
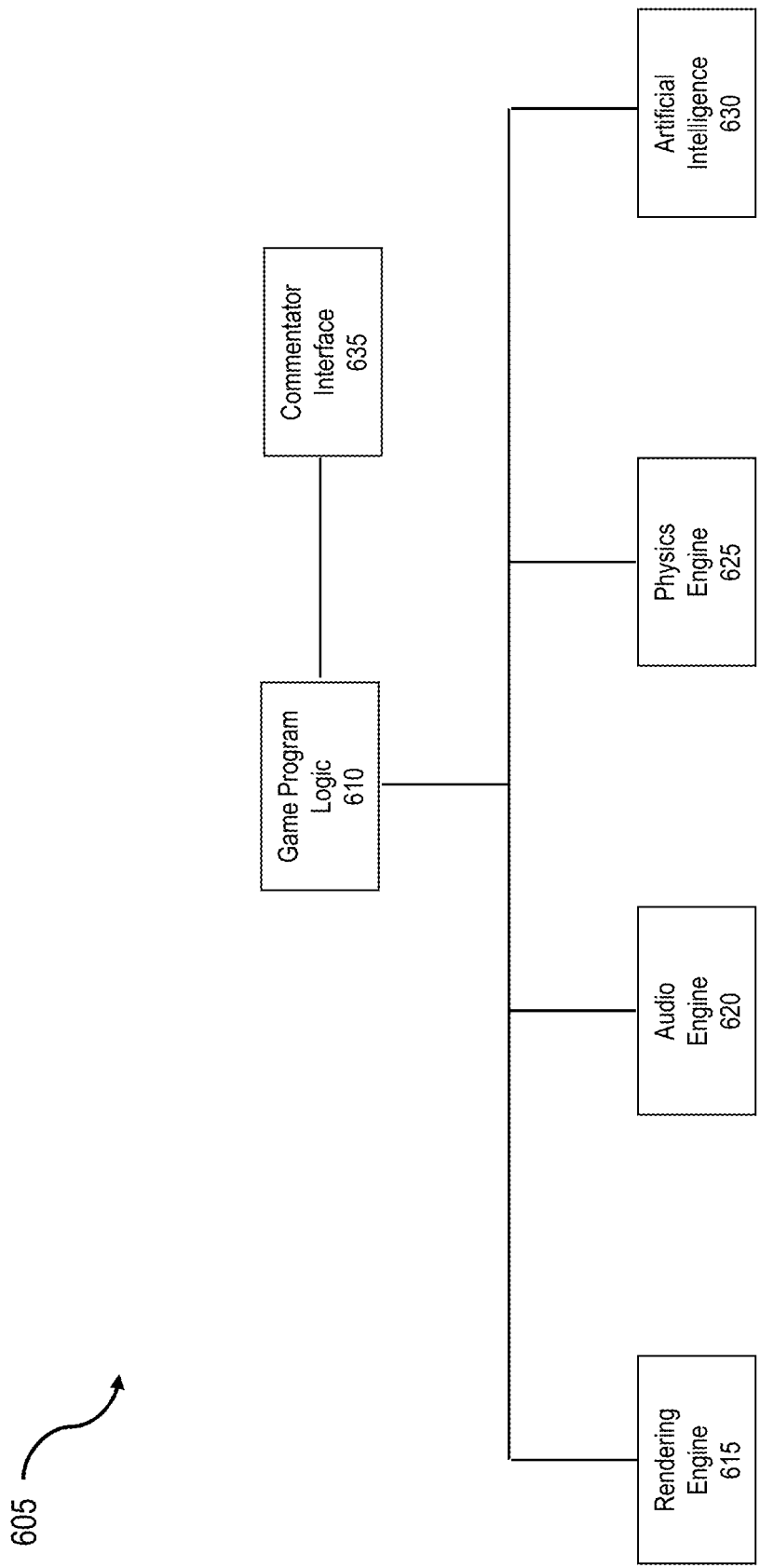
FIG. 6 is a system block diagram illustrating an example reconstruction engine that enables the media management server to recreate a game environment from game state data and/or user activity data and enable a commentator to generate a new video from a new view point.

FIG. 6 is a system block diagram illustrating an example reconstruction engine 605 that enables the media management server 310 to recreate a game environment from game state data and/or user activity data and enable a commentator to generate a new video from a new view point.

Reconstruction engine 605 can include an extended game engine that enables reconstruction of the game environment from user action data and/or from game state data. The reconstruction of the game environment can be performed in an ongoing manner to provide for commentator coverage of a live event. The reconstruction of the game environment can be performed for any past point in time enabling the commentator to analyze and generate video of past gameplay with a new view-point. This can be achieved by maintaining a database of historical user action data and/or game state data. Reconstruction engine 605 can be an extension of the game engine that is incorporated into the game application 230 that is executing on player clients 220. Game state data and/or user action data that originates at the player client 220 can be utilized by the reconstruction engine to recreate the gaming environment. Reconstruction engine 605 can utilize data files that are normally utilized by the gaming application such as maps, level specifications, and the like.

Reconstruction engine 605 can include game program logic 610, a rendering engine 615, audio engine 620, physics engine 625, artificial intelligence 630, and commentator interface 635. Game program logic 610 includes actual game logic describing game mechanics. Rendering engine 615 generates animated graphics (e.g., 2D or 3D) and utilizes one or more rendering application programming interfaces (APIs), such as Direct3D or OpenGL. Audio engine 620 processes audio data and can utilize APIs, such as OpenAL, SDL audio, XAudio 2, Web Audio, and the like. Physics engine 625 emulates the laws of physics for the gaming environment. Artificial intelligence 630 provides guidance for some game controlled elements, such as non-player characters (NPCs).

Commentator interface 635 can enable input from commentator 320. This input can include providing viewing parameters such as viewing position, viewing angle, field of view, visible or non-visible portions of the field of view, and the like. The commentator interface 635 can provide the commentator input data to the game program logic rendering of the game environment using the commentator viewing parameters.

FIG. 7 is a process flow diagram illustrating a method 700 of generating a video stream from a commentator perspective. The method 700 can utilize user action data and/or game state data to reconstruct a game environment. This approach can reduce data transmission requirements (game state data and user action data can be smaller than view data) and enables a commentator to create a video from a new vantage point that can be different than player vantage points.

At 710, user action data is received. The user action data describes or characterizes action by a player in an executing game environment. For example, the user action data can include user interface inputs made by the user such as key strokes, button presses, mouse movement, joystick movement, directional pad input, and the like. In some implementations, the user action data is created by the player client 220 (e.g., a user client) and can be received by media management server 310 from a player client 220. In some implementations, the user action data can be received from game server 250. Game state data can also be received. The game state data can include, for example, character position, character orientation, and any other attributes and/or data necessary to reconstruct the gaming environment at a particular point in time. The game state data can include the user action data.

At 720, a selected viewing position can be received. The selected viewing position can be received from commentator 320. The selected viewing position can be different than a player viewing position and can include a location for viewing the game environment (e.g., a field of view).

At 730, a recreation of the game environment can be generated at the media management server 310. The gaming environment can be recreated from the user action data and/or the game state data. In some implementations, recreating the game environment can include executing a game engine (e.g., reconstruction engine 605) using game state data, the user activity data, and the selected viewing position. The game engine can receive the viewing position, game state data, and the user action data and renders the game environment from the perspective of the viewing position.

At 740, a video stream of the recreated game environment is generated. The video stream can by captured from the recreated environment rendered by the game engine. The video stream may include view from a perspective of the selected viewing position. The video stream can be generated by the media management server 310.

At 750, the video stream can be provided. The video stream can be transmitted to a viewing client device. The video stream can be provided to a user interface for further editing and/or curation by the commentator, for example, by utilizing the interface illustrated in FIG. 5.

In some implementations, different viewing parameters can be used, such as viewing angle, a specific field of view, viewing effects (e.g., black and white, adjustment of contrast/color/brightness, additional video overlay, and the like), and the like. In some implementations, an audio stream may be received from commentator 320 and/or a player client 220. The audio stream may be combined with the generated video stream prior to transmission to viewing clients 330 or can be transmitted with the video stream for simultaneous media consumption.

In general, video game streamers can engage with their audience by showing live footage of their own gameplay. But in an eSports tournament, mere streaming of a display does not convey what is happening to other players in separate parts of a game or eSports competition. As eSports grow in popularity, the media management server 310 solves a need for a toolkit that allows streamers, as individuals, to perform the same level of commentary and gameplay analytics that is performed by analyst teams in the parallel industry of physical sports.

Media management server 310 provides an automated broadcast studio for a streamer 320 to cover (e.g., comment on) an eSports tournament in any game. The media management server can have two types of end users. The first is the viewing clients 330. The viewing clients 330 do not have exposure to stream tools that are available as part of the media management server 310. Instead, the viewing clients 330 are able to see the content shared by the tournament commentator 320. An example of the content shared by the tournament commentator 320 is illustrated in FIG. 4. This includes video replays 410, a feed of the streamer 420, tournament information 430, and current leaderboard status 440.

The second end type of user is the tournament commentator 320 or "streamer" who uses the media management server 310 to deliver a high quality and engaging video feed to their audience. The streamer is able to capture video from all tournament participants; preview the captured video to privately view the replay of a player without sharing that video to the live stream; interact with a video queue interface to view, select, and play videos or clips; and receive suggestions for automatically portioned and assembled video broken into highlight reels and/or key segments with game analytics.

Media management server 310 in combination with peer-tournament module 240, can automatically capture and record video replay of all players 210, who participate in a tournament. In addition, a video stream can be generated by recreating the game environment and allowing the commentator to select viewing parameters allowing a controllable commentator view-point, for example, as described above with reference to FIGS. 6 and 7.

Through the media management server 310, a streamer 320 hosting a tournament has access to a list of all competitors or players 210, in the event that he or she is hosting and each player's 210 associated video capture. For each player 210, the streamer 320 has at least two actions that they can take using the captured video replay. They can preview the captured video in which the streamer 320 privately views the captured video of a player 210 without sharing that video to the live stream. This tool gives the streamer 320 flexibility to review plays before having to speak about them, seek out a specific moment of the replay that he or she wants to show, or otherwise preview the video before showing it to his or her audience. The streamer 320 can also add the selected video to a video queue, which specifies the next video portions to be streamed on the live broadcast stream.

FIG. 5 is a user interface illustrating a video control panel 500 (also referred to as graphical user interface 500). The video control panel 500 includes a video queue interface 510 for streamers 320 to view, select, and play videos or clips. The video queue interface 510 allows the streamer to interact with and control what is being broadcasted to his or her stream. The video queue interface 510 includes two components: a now playing stream 510B, and a queue 510A.

The now playing stream 510B shows the streamer 320 what replay is being currently broadcasted (e.g., the live video stream or feed). This is a persistent space that allows the streamer 320 to monitor what they are currently sharing even while using the window to preview streams or adjust replays in a way that will not be shared with the audience.

The queue 510A gives the streamer 320 the capability to control the order that video portions or replays will be shown. The streamer 320 may add individual video portions that they would like to show next, or change the order of what videos are up next to be broadcasted. If the streamer 320 chooses not to add anything to the queue, or if the queue becomes empty, the system can automatically stream video of one of players using the across-match comparison, for example, by streaming video of one of the top three performing players 210, the video of the player 210 having the greatest change in score over a one minute period of time, and the like.

Video control panel 500 includes a list of players 520 participating in tournament matches and for which video capture is available for broadcast to a wider audience. The list of players 520 includes options to preview 520A or add 520B their replay to the queue 510A. Video control panel 500 further includes a preview space 530 for viewing video and a list of historical game replays 540 with options to preview 540A or add 540B the historical game replay to the queue 510A.

In some implementations, media management server 310 automatically breaks down video captured at the player clients 220 into highlight reels and key segments, and assembles a suggested broadcast for the streamer 320. Thus media management server 310 enables automated functionality that acts as the streamer's 320 own "behind the scenes analyst team." This allows the streamer 320 to work as a one person team and easily select the correct footage to play without having to take breaks from the live stream to look up past footage or stats. Automatic analytics and features include the rank ordering of replays that causes replays and player lists to appear in the queue 510A in order of their current rank in the tournament. This makes it easy to find the replay for any player based upon where they stand. Prior to watching the video the streamer can know what level of player they are selecting and what the outcome of their game might be.

Automated media management server 310 functionality includes providing a list of historical game replays. This can include links to historical replays of the same game that occurred during previous tournaments. This allows the streamer 320 to bring up their favorite footage for easy reference. For example, the streamer 320 can show the best game ever recorded, keep a reference of themselves playing the game, or use footage with a specifically interesting or relevant play or strategy. In some implementations, the historical replays can include game state data including user activity data that enables recreation of the gaming environment, allowing the commentator to recreate a past game and generate a new video of the gameplay, possibly from a new view point.

Automated media management server 310 functionality includes providing notifications when there is a change within top of leaderboard. The streamer 320 can be notified (in addition to the leaderboard changing) when there is a change in position amongst top players in a tournament.

Referring again to FIG. 1, server 102 can include a processor(s) 112 is configured to provide information processing capabilities to a computing device having one or more features consistent with the current subject matter. Processor 112 may include one or more of a digital processor, an analog processor, a digital circuit designed to process information, an analog circuit designed to process information, a state machine, and/or other mechanisms for electronically processing information. Although processor 112 is shown in FIG. 1 as a single entity, this is for illustrative purposes only. In some implementations, processor 112 may include a plurality of processing units. These processing units may be physically located within the same device, or processor 112 may represent processing functionality of a plurality of devices operating in coordination. The processor 112 may be configured to execute machine-readable instructions, which, when executed by the processor 112 may cause the processor 112 to perform one or more of the functions described in the present description. The functions described herein may be executed by software; hardware; firmware; some combination of software, hardware, and/or firmware; and/or other mechanisms for configuring processing capabilities on processor 112.

Server 102 can include electronic storage 114. Electronic storage 114 can be configured to store information. Electronic storage 114 can be configured to store computer readable instructions which, when executed by processor 112, can cause processor 112 to perform one or more operations described in the present description.

Electronic storage 114 may comprise electronic storage media that electronically stores information. The electronic storage media of electronic storage 114 may include one or both of system storage that is provided integrally (i.e., substantially non-removable) with a computing device, such as server 102, client device 104, and/or removable storage that is removably connectable to server 102 via, for example, a port (e.g., a USB port, a firewire port, etc.) or a drive (e.g., a disk drive, etc.). Electronic storage 114 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 114 may include one or more virtual storage resources (e.g., cloud storage, a virtual private network, and/or other virtual storage resources). Electronic storage 114 may store software algorithms, information determined by processor 112, information received from one or more computing devices, such as server 102, client computing devices 104 information that enables the one or more computing device to function, or the like.

Without in any way limiting the scope, interpretation, or application of the claims appearing herein, a technical effect of one or more of the example embodiments disclosed herein may include facilitating the provision of curated and commentated streams of video game play.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method comprising:
    receiving, at a first data processor, user action data characterizing player action in a game environment executing at a client, the game environment instantiated by the client separate from the first data processor, the client rendering the game environment from a first spatial position within the game environment;
    receiving, at the first data processor, data characterizing a viewing position including a second spatial position within the game environment, the second spatial position different than the first spatial position; and
    rendering, using the user action data, a recreated game environment including past player action from a perspective of the selected viewing position.

2. The method of claim 1, wherein the user action data includes data characterizing user interface actions by a player with the game environment.

3. The method of claim 1, wherein rendering the recreated game environment includes executing a game engine using game state data and the user activity data.

4. The method of claim 3, wherein the game engine receives the viewing position and the user action data and renders the recreated game environment from the perspective of the viewing position.

5. The method of claim 1, wherein the user activity data is retrieved from a database and the user activity data is associated with a historical game play.

6. The method of claim 1, wherein the user activity data is received from the client or a game hosting server; and
    wherein the user activity data is from an ongoing executing game environment.

7. The method of claim 1, further comprising:
    generating a video stream of the recreated game environment, the video stream including video replay of past player action from the perspective of the viewing position; and
    transmitting the video stream to a viewing client;
    wherein generating the video stream includes capturing the rendered recreated game environment.

8. The method of claim 7, further comprising:
    receiving an audio stream; and
    combining the audio stream with the video stream prior to transmission of the video stream.

9. The method of claim 1, further comprising:
    generating statistics on a player using the user action data; and
    transmitting statistics to a viewing client.

10. The method of claim 1, further comprising:
    updating the recreated game environment using the user action data to visualize the past player action over time.

11. The method of claim 1, wherein the viewing position is dynamic over time and a perspective of a video replay of past player action varies over time based on changes in the viewing position.

12. The method of claim 1, further comprising:
    simultaneously displaying a generated video stream and a live video stream of gameplay by a player within a user interface of a commentator client.

13. The method of claim 1, wherein the rendering is performed by a first data processor or by a server remote from the first data processor.

14. A system comprising:
    a first data processor and memory storing instructions, which when executed by the first data processor, cause the first data processor to perform operations comprising:

receiving, at the first data processor, user action data characterizing player action in a game environment executing at a client, the game environment instantiated by the client, the client rendering the game environment from a first spatial position within the game environment;

receiving, at the first data processor, data characterizing a viewing position including a second spatial position within the game environment, the second spatial position different than the first spatial position; and rendering, by the first data processor and using the user action data, a recreated game environment including past player action from a perspective of the viewing position.

15. The system of claim 14, wherein the rendering is performed by the first data processor or by a server remote from the first data processor.

16. The system of claim 14, wherein determining the recreated game environment includes executing a game engine using game state data and the user activity data.

17. The system of claim 16, wherein the at least one data processor includes the game engine that receives the viewing position and the user action data and renders the recreated game environment from the perspective of the viewing position.

18. The system of claim 14, the operations further comprising:
generating a video stream of the recreated game environment, the video stream including video replay of past action by the player from the perspective of the viewing position; and
transmitting the video stream to a viewing client;
wherein generating the video stream includes capturing the rendered recreated game environment.

19. The system of claim 18, the operations further comprising:
receiving an audio stream;
combining the audio stream with the video stream prior to transmission of the video stream;
generating statistics on a player using user action data;
transmitting statistics to a viewing client;
simultaneously displaying the generated video stream and a live video stream of gameplay by the player within a user interface of a commentator client.

20. A non-transitory computer program product storing executable instructions, which, when executed by at least one data processor forming part of at least one computing system, implements operations comprising:
receiving, at the first data processor, user action data characterizing player action in a game environment executing at a client, the game environment instantiated by the client, the client rendering the game environment from a first spatial position within the game environment;
receiving, at the first data processor, data characterizing a viewing position including a second spatial position within the game environment, the second spatial position different than the first spatial position; and
rendering, at the first data processor and using the user action data, a recreated game environment including past player action from a perspective of the viewing position.

* * * * *